Sept. 7, 1937.  C. A. OLSON  2,092,587

MACHINE TOOL

Filed Dec. 16, 1935

INVENTOR.
Charles Alfred Olson
BY
Fred G. Parsons
ATTORNEY.

Patented Sept. 7, 1937

2,092,587

UNITED STATES PATENT OFFICE 2,092,587

MACHINE TOOL

Charles Alfred Olson, Madison, Wis., assignor to Gisholt Machine Company, Madison, Wis., a corporation of Wisconsin Application December 16, 1935, Serial No. 54,651

12 Claims. (Cl. 82—32)

This invention relates to machine tools and more particularly to the construction of slideways or guides for the movable supports thereof, and especially for lathes.

An object of the invention is to provide an improved slideway or guide for a movable machine tool support in which hardened and ground portions are incorporated in an improved relationship with the main frame or support, such that the hardened portions may be ground while separate from the main support, and later fitted to the main support in the exact intended alignment, particularly for the carriageways of a lathe.

Another object is to provide a guideway or slide in which certain bearing portions are of improved construction to be fixed with the main structure or support, and fitted therewith in a manner which provides for replacement in the exact previous position and alignment, and particularly for the carriage slide of a lathe.

Another object is to provide a lathe carriage slide in which the guide surfaces are of improved form and relationship relative to one another and to the spindle of the lathe.

Other objects are to provide an improved combination of a lathe bed and carriage slide, in which supporting bed is in improved relationship to the slide surfaces, for effecting one or more of the objects previously mentioned, and of a form for co-acting therewith for an improved resistance to distortion under cutting load, and still other objects will be apparent from the specification.

The invention consists in the construction and combination of parts as herein illustrated, described and claimed, and in such modifications of the structure illustrated and described as may be equivalent to the structure of the claims.

In this specification like reference characters have been used for the same parts throughout, and in the drawing.

Figure 1:
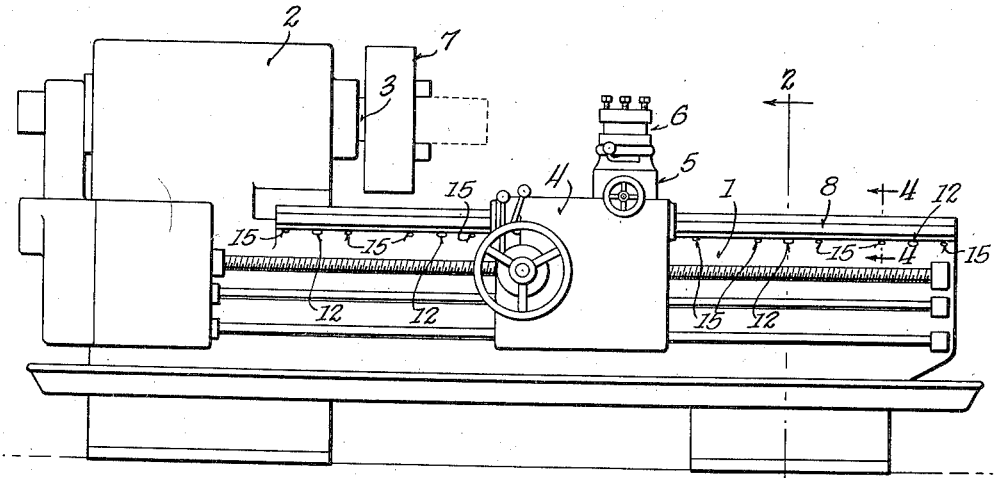
Fig. 1 is a front elevation of a machine tool which incorporates the invention.

The machine tool shown in Fig. 1 is a lathe having a bed portion 1, rigidly fixed or integrally formed with a head-stock portion 2, in which there is rotatably mounted a spindle 3. A carriage 4 is slidably guided on bed 1 for movement in a direction parallel with the axis of spindle 3, and a cross-slide carriage 5 is guided on carriage 4 for bodily movement therewith, and for movement transverse to the spindle axis. A tool turret 6 is carried by the cross-slide 5, and a chuck 7 is fixed on the end of spindle 3. The spindle 3, carriage 4 and cross-slide 5 are provided with transmission and control mechanism, not shown, which may be of any suitable well known form.

Figures 2, 3, 4:
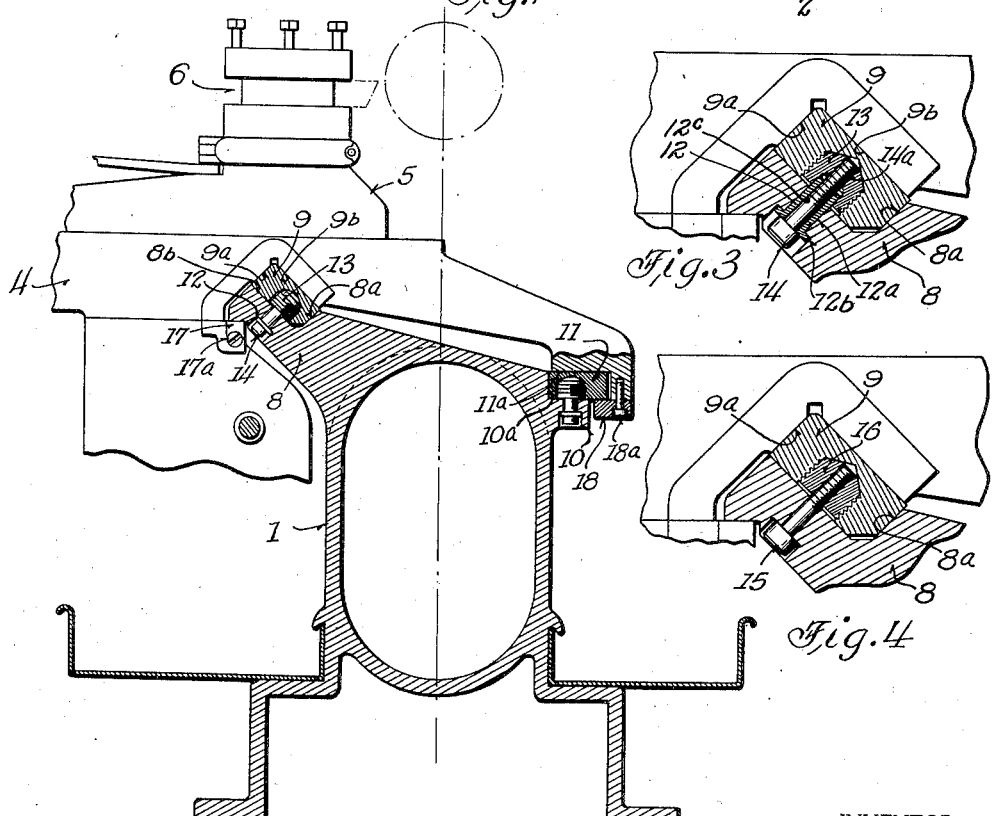
Fig. 2 is a partial vertical section, taken along line 2—2 of Fig. 1 and enlarged.
Figs. 3 and 4 are partial vertical sections through front and rear slide portions respectively, taken along line 4—4 of Fig. 1, and enlarged.

Bed 1, substantially throughout its lateral extension in Fig. 1, is in the form of a flattened tube, as shown in Fig. 2, to which are rigidly and integrally fixed a forwardly projecting portion 8, carrying a hardened and ground front slide member 9 rigidly fixed thereon, and a rearwardly projecting portion 10 carrying a hardened and ground rear slide member 11 rigidly fixed thereon, each of the front and rear projecting portions 8, 10, and slide members 9, 11 extending along bed 1 through the entire range of movement of carriage 4, as shown for the front projecting portion 8 and front slide member 9 in Fig. 1.

Each of the front and rear slide members 9, 11 are rigidly fixed with the respective projecting bed portions by similar fastening means which will therefore be described in detail only for the slide member 9. At spaced points along the bed and engaging the slide member there are provided locating dowels such as 12, Fig. 3 having a shank portion 12a which closely fits a suitable bore in the projecting bed portion and extends to closely fit within a soft steel insert such as 13, which is rigidly permanently fixed in the hardened slide member, as for instance by threading the member 13 and the bore in the slide member, then hardening the slide member, then screwing the member 13 into the threaded bore, then welding the two elements together around the edge of the exposed face of the member 13.

The dowel member 12 also provides an abutment for a fastening screw such as 14, there being an abutment head 12b on the dowel, and the dowel providing a bore 12c, through which the screw 14 is extended for a threaded portion 14a to engage a complementary thread in the member 13. Similar screw members are spaced at regular points along both the front and rear slide members 1, 11 as indicated for the member 9 at 12, 12 etc. Fig. 1.

Additional fastening means for each of the front and rear slide members 9, 11 comprise screws, such as 15, Fig. 4 extending through the projecting bed portions to engage threaded soft steel inserts such as 16, which are similar to the insert 13 except that there is no provision made for dowels, and are similarly permanently rigidly fixed in the slide members. Screws such as 15 are spaced at regular intervals along the entire length of both slide members, as indicated for the slide member 9 at 15, 15, Fig. 1. The soft inserts in the hardened slide members permit of the members being first hardened uniformly throughout, thereby avoiding distortion such as would be incidental to leaving certain portions soft in order to provide for the holding screws or dowels. Later, after the slide members are hardened the soft inserts may set in place after which the slide members may be accurately ground. Still later the slides may be fitted in position on the bed and the dowel or screw holes finished in exact alignment in the bed and in the soft steel inserts. The inserts and the arrangement of the slides also permits of a bearing surface which is without holes or recesses in which foreign material might collect to cause abrasion of the under side of the carriage guided thereon. It is to be understood that in certain instances, or where the slides may be constructed of certain materials, the holes for screws 15 may be finished directly in the slides 9, 11 before the slides are hardened. In such instances the soft steel inserts 16 are not required for screws 15, but the bores where the screws pass through the bed must be enlarged by an amount sufficient to allow for changes or distortion of the slides during hardening.

The members 9, 11 provide three carriage bearing surfaces consisting of the surfaces 9a, 9b on the member 9, and a surface 11a on the member 11, which together are sufficient to completely determine the path of travel of carriage 4 parallel to the axis of the spindle and, since the surfaces 9a, 9b, 11a are each on hardened material and accurately ground, the accuracy of alignment will be indefinitely maintained.

The projecting bed portions 8, 10 provide three surfaces 8a, 8b, 10a respectively in planes accurately parallel to the planes of carriage bearing surfaces 9a, 9b and 11a, and the surfaces of the members 9, 11 which bear against the surfaces 8a, 8b, 10a are ground accurately parallel with the bearing surfaces 9a, 9b, 11a respectively.

The arrangement described, and the method of fastening the slide members to the bed, permit of the removal and replacement of the slide members 9, 11 in exact proper alignment.

The slide surfaces 9a, 9b, 11a and the alignment surfaces 8a, 8b, 10a on bed 1, in this instance are arranged with especial reference to the direction and amount of thrusts acting on the carriage 4 in the normal use of the lathe. Thus, in most turning operations, a considerable component of the cutting force is downward and approximately centrally of the tubular bed structure shown in Fig. 2. It will be noted that the projected bearing areas of the slide members 9, 11 in this direction are relatively large, approximately equal, and about equi-distant from the central vertical axis of the tubular bed.

The bearing surfaces 9a, 9b form a V having a 90 degree included angle, which is efficient to prevent lateral carriage displacement, and readily accurately produced and tested. This angle also permits the member 9 to be of rectangular cross-section so far as concerns the various surfaces where accuracy and parallelism is required. The member 11 is also of rectangular section, and it is obvious that all the active alignment surfaces are formed as one of the flat surfaces of a rectangular section.

By reason of the form and construction of the holding devices, the form and position of the slide elements 9, 10, and the construction providing accurate surfaces on the bed which correspond to and locate the active slide surfaces on the slide members, it is not necessary that the slide members should be finished while in place on the machine. Thus they may be finished in accurate rectangular form and later applied to the machine without further finishing operations, excepting only to finish the holes in the soft steel inserts 13, and also in inserts 16, if such inserts are used for the screws 15, and if one of the slide members should be damaged it can be replaced without bringing the lathe to another machine for a final fishing operation of the carriage bearings.

To prevent tipping of the carriage there are provided the gibs 17, 18 respectively at the front and rear of the carriage, which may be of any suitable well known form. In this instance the gib 17 is tapered in the direction of the spindle axis and adjustable in a well known manner by a screw 17a. The gib 18 is a flat gib, adjusted by screws such as 18a. For convenience the gib 18 is made to bear against the under side of the hardened slide member 11, which overhangs the bed portion 11 for this purpose, as shown in Fig. 2.

What is claimed is:

1. In a machine tool the combination of a frame, a support bodily movable thereon, and means for guiding said support for movement in a straight line path including portions providing a plurality of groups of guide surfaces extended in the direction of said movement and spaced apart laterally relative thereto, said portions including a hardened guide member removably supported on said frame and providing a plurality of relatively angular guide surfaces forming some of the surfaces of one of said groups, and retaining means for said member including a plurality of unhardened elements separately formed and rigidly fixed with said member in spaced relationship in the direction of said movement, and a plurality of removable elements respectively engaging different of said unhardened elements and each simultaneously engaging said frame.

2. In a machine tool the combination of a frame, a support bodily movable thereon, and means for guiding said support for movement in a straight line path including portions providing a plurality of groups of guide surfaces extended in the direction of said movement and spaced apart laterally relative thereto, said portions including a hardened guide member removably supported on said frame and providing a plurality of relatively angular guide surfaces forming some of the surfaces of one of said groups, and means fixing the position of said member relative to said frame including a plurality of holding elements, each engaging said frame and spaced apart in the direction of said movement, and a plurality of unhardened elements associated with said member and respectively engaging different of said holding elements, said unhardened elements being formed separately from said member and rigidly integrally joined thereto in spaced positions to be engaged by different of said holding elements.

3. In a lathe, the combination of a rotatable spindle, a bed carrying said spindle and extended in the direction of the spindle axis, a carriage carried on said bed for movement in a direction parallel with said spindle axis, and means for guiding said carriage including a plurality of guide portions extended parallel with the spindle axis and spaced apart laterally, one of said guide portions comprising a hardened member removably fixed on said bed, and means for fixing said bed and member together including a plurality of unhardened elements separately formed and rigidly fixed with said member at spaced points in the direction of said spindle axis and a plurality of holding elements simultaneously engaging said bed and different of said unhardened elements respectively.

4. In a lathe, the combination of a rotatable spindle, a bed carrying said spindle and extended in the direction of the spindle axis, a carriage carried on said bed for movement in a direction parallel with said spindle axis, and means for guiding said carriage including a plurality of guide portions extended parallel with the spindle axis and spaced apart laterally, one of said guide portions comprising a hardened member having a plurality of surfaces respectively in different planes mutually angularly disposed and intersecting along a line parallel with the spindle axis, said member being removably fixed on said bed, and means for fixing said bed and member together including a plurality of unhardened elements separately formed and integrally joined with said member and spaced along said member in the direction of said spindle axis, and a plurality of holding elements simultaneously engaging said bed and different of said unhardened elements respectively.

5. In a lathe, the combination of a rotatable spindle, a bed carrying said spindle and extended in the direction of the spindle axis, a carriage carried on said bed for movement in a direction parallel with said spindle axis, and means for guiding said carriage including a plurality of guide portions extended parallel with the spindle axis and spaced apart laterally, one of said guide portions comprising a hardened member fixed on said bed, and means for removably accurately positioning said member with respect to said bed and including a plurality of separately formed unhardened elements having an internal bore, said elements being rigidly fixed with said member and spaced apart in the direction of said spindle axis, and a plurality of dowel elements simultaneously engaging said bed and different of said internal bore elements respectively.

6. In a lathe the combination of a rotatable spindle, a bed carrying said spindle and extended in the direction of the spindle axis, a carriage carried on said bed for movement in a direction parallel with the spindle axis, said bed including an overhanging portion extended along the bed in the direction of the spindle axis, means for guiding said carriage in a predetermined path relative to said spindle axis including a hardened guide extended in the direction of said spindle axis and removably fixed on said overhanging bed portion, said guide providing a plurality of recesses on the under side thereof adjacent said overhanging bed portion and spaced apart in the direction of said spindle axis, a plurality of unhardened elements respectively rigidly fixed within different of said recesses, and a plurality of holding elements extended through said overhanging portion upwardly to engage different of said unhardened elements respectively.

7. In a lathe, the combination of a rotatable horizontal spindle, a bed carrying said spindle and providing a portion extending in the direction of said spindle axis, a carriage guided on said bed for movement in the direction of said spindle axis, and guide means for said carriage including a plurality of groups of guide surfaces respectively spaced on opposite sides of the vertical plane of said spindle axis, said guide means including a hardened member removably fixed with said bed portion to extend exteriorly thereof in the direction of said spindle axis, an upper portion of said member providing some of the surfaces of one of said groups, and a lower portion providing a plurality of relatively shallow recesses terminating underneath said guide surfaces and spaced apart in the direction of said spindle axis, and retaining means for fixing the position of said member relative to said bed including unhardened elements formed separately from said member and rigidly fixed within different of said recesses respectively, and holding elements rigidly fixed with said bed and extending upwardly to engage different of said unhardened elements respectively.

8. The method of construction of a hardened machine tool slide which consists in first hardening a slide member, then fixing therewith an unhardened separately formed element while said member remains in hardened condition, then completely finishing said member on all the slide bearing surfaces thereof, then placing said member on a support in the final intended relative position thereof, and then machining said unhardened element to a desired form.

9. The method of construction of a hardened machine tool slide which consists in first hardening a slide member, then fixing therewith an unhardened separately formed element while said member remains in hardened condition, then completely finishing said member on all the slide bearing surfaces thereof, then placing said member on a support in the final intended relative position thereof, and then simultaneously machining said unhardened element and a portion of said support to provide co-operating surfaces for retaining the member in said final intended position.

10. In a machine tool the combination of a frame, a support bodily movable thereon, means for guiding said support for bodily movement in a straight line path including a hardened guide member fixed to said support and extended in the direction of said movement, said member providing a plurality of relatively shallow recesses opening to the face thereof adjacent said frame and spaced apart in the direction of support movement, and means fixing the relative position of said member and frame including a plurality of unhardened elements separately formed and respectively rigidly fixed in different of said recesses, and a plurality of removable elements respectively engaging different of said unhardened elements and each simultaneously engaging said frame.

11. In a machine tool the combination of a frame, a support bodily movable thereon, means for guiding said support for bodily movement in a straight line path including a hardened guide member fixed to said support and extended in the direction of said movement, said member providing a plurality of relatively shallow recesses opening to the face thereof adjacent said frame and spaced apart in the direction of support movement, and means fixing the relative position of said member and frame including a plurality of unhardened elements separately formed and respectively integrally joined with said member in different of said recesses, and a plurality of removable elements respectively engaging different of said unhardened elements and each simultaneously engaging said frame.

12. In a machine tool the combination of a frame, a support bodily movable thereon, means for guiding said support for bodily movement in a straight line path including a hardened guide member fixed to said support and extended in the direction of said movement, said member being substantially rectangular in cross section and fixed with said frame for two of the sides corresponding to sides of the rectangle to form slideways disposed at angles together preventing movement of said support in either direction transverse to said straight line path, one of the other sides of said member being fixed against said frame and providing a series of shallow recesses opening to the side thereof adjacent said frame and of less depth than the thickness of said member between the side last mentioned and the opposite side, and means fixing the relative positions of said member and frame including a plurality of unhardened elements separately formed and respectively rigidly fixed in different of said recesses and a plurality of removable elements respectively engaging different of said unhardened elements and each simultaneously engaging said frame.

CHARLES ALFRED OLSON.